Sept. 11, 1934.  C. I. WOODS  1,973,423

BUTTER DISPENSING MACHINE

Filed Aug. 26, 1932  4 Sheets-Sheet 1

INVENTOR.
Clarence I. Woods
BY
ATTORNEY.

Sept. 11, 1934.    C. I. WOODS    1,973,423
BUTTER DISPENSING MACHINE
Filed Aug. 26, 1932    4 Sheets-Sheet 2
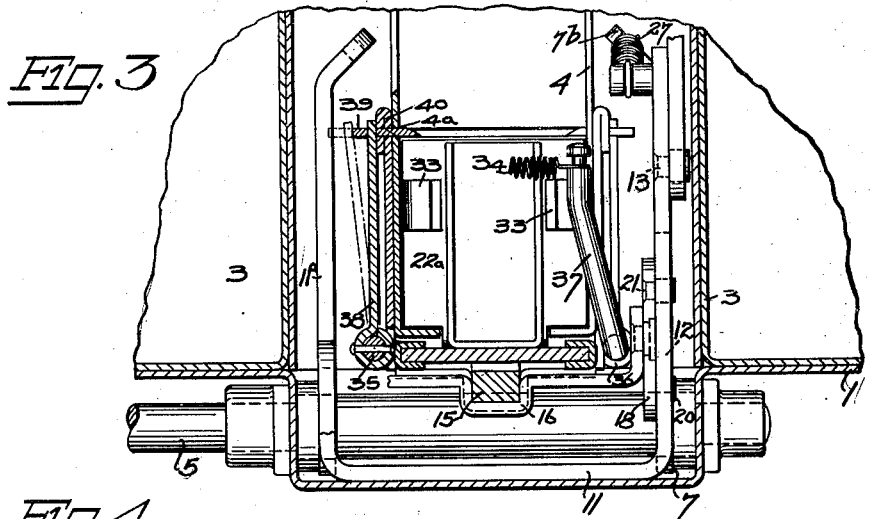
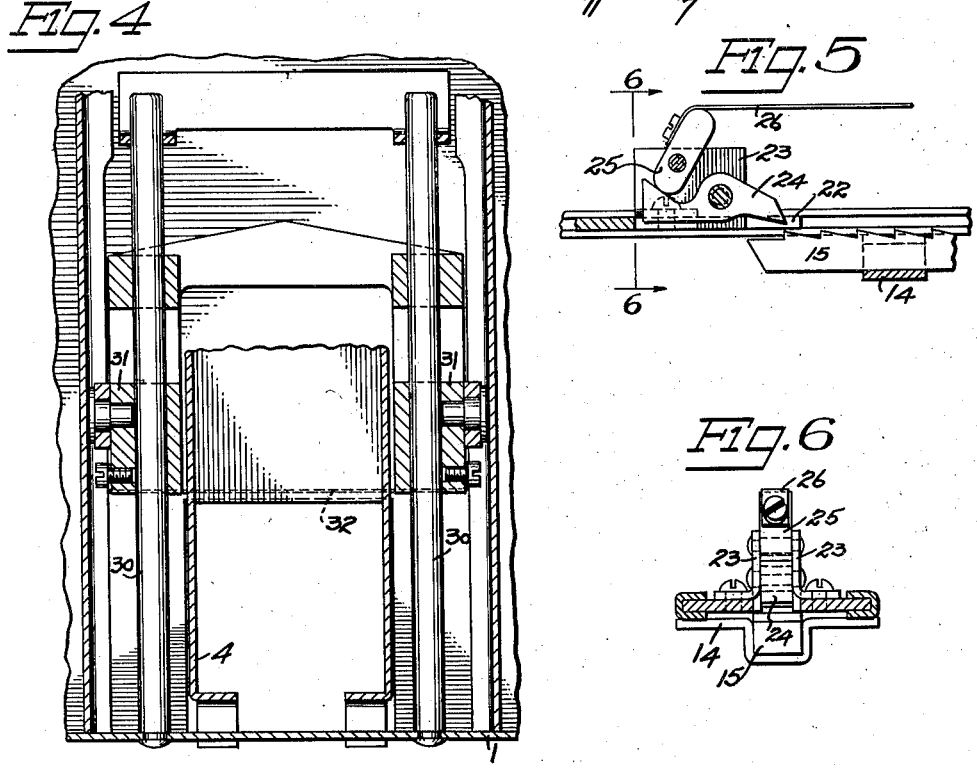
INVENTOR.
Clarence I. Woods
BY
ATTORNEY.

Sept. 11, 1934.　　　　C. I. WOODS　　　　1,973,423
BUTTER DISPENSING MACHINE
Filed Aug. 26, 1932　　　4 Sheets-Sheet 3
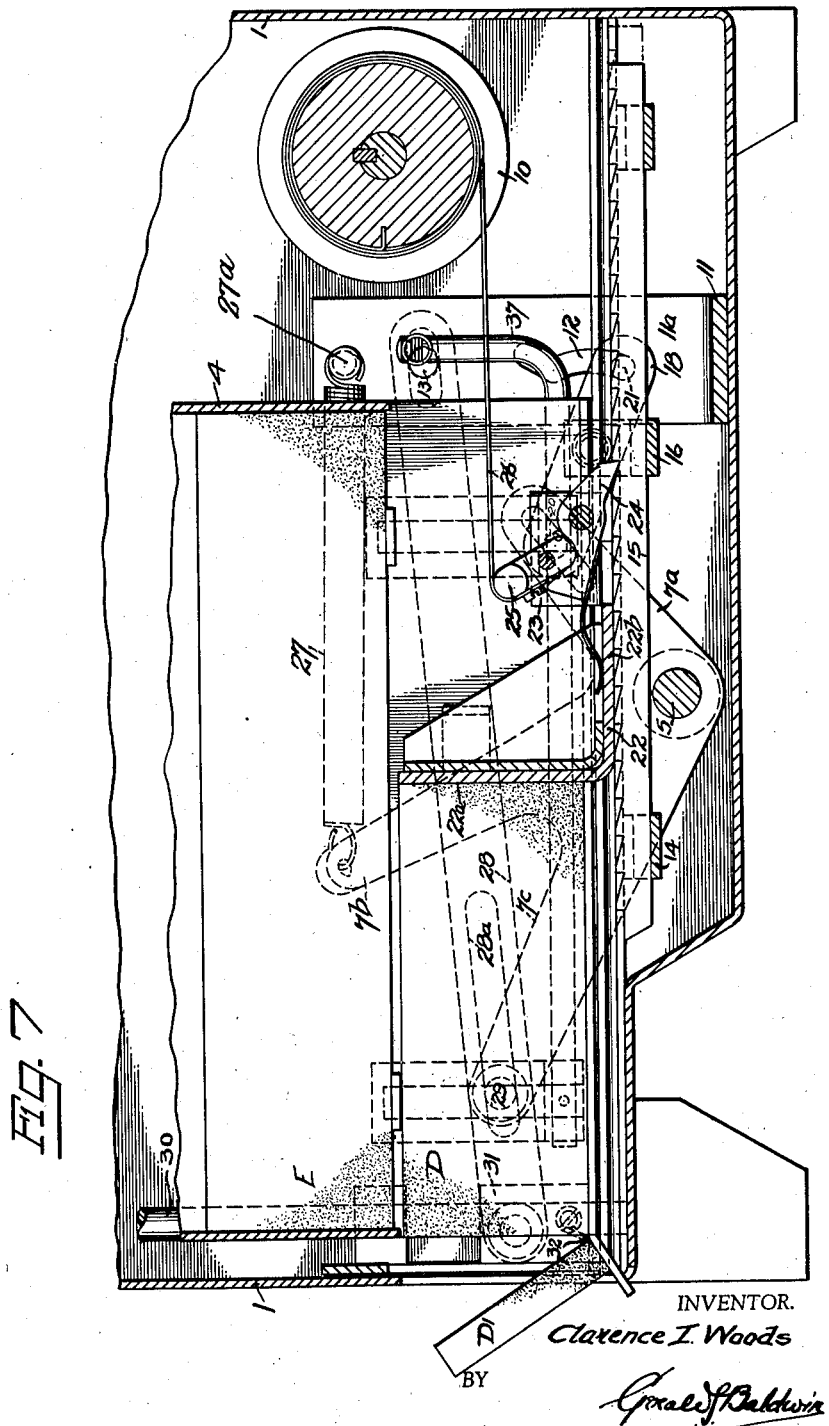
INVENTOR.
Clarence I. Woods
BY
Gerald J. Baldwin
ATTORNEY.

Sept. 11, 1934.   C. I. WOODS   1,973,423
BUTTER DISPENSING MACHINE
Filed Aug. 26, 1932   4 Sheets-Sheet 4
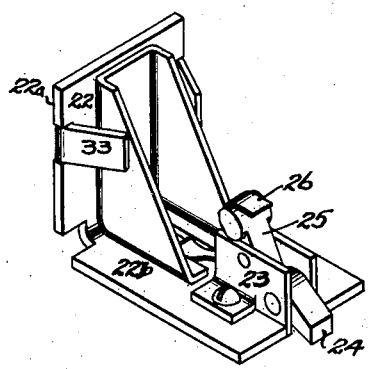
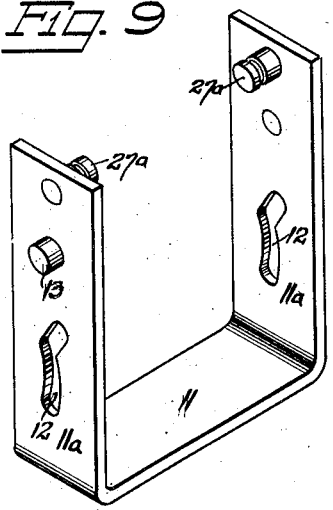
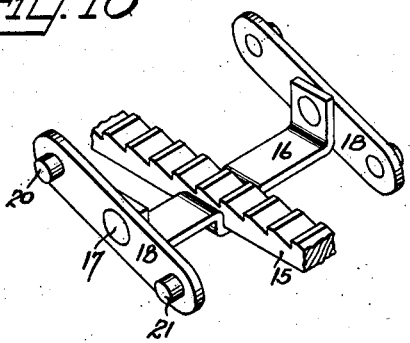
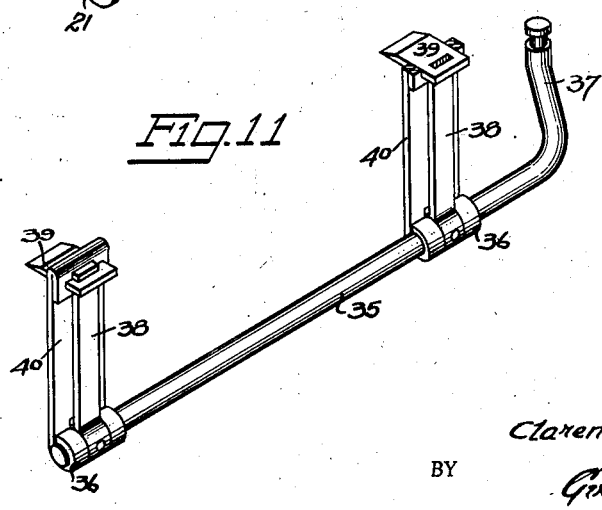
INVENTOR.
Clarence I. Woods
BY
ATTORNEY.

Patented Sept. 11, 1934

1,973,423

UNITED STATES PATENT OFFICE 1,973,423

BUTTER-DISPENSING MACHINE

Clarence I. Woods, Hollywood, Calif.

Application August 26, 1932, Serial No. 630,501

19 Claims. (Cl. 31—20)

This invention relates to improvements in butter dispensing machines. It is an object of the invention to provide such a machine consisting of a casing having spaced and removable refrigerating compartments therein between which a removable butter container is provided adapted to receive a number of slabs of butter placed one upon the other which are kept cool and prevented from adhering to one another by the refrigerant in the refrigerating compartments; and to provide means for advancing the bottom slab of butter through the container so that its front extremity projects therefrom, and for cutting off the forwardly projecting butter extremity.

Another object of the invention is to provide a butter dispensing machine wherein means are provided for advancing the bottom slab of butter a uniform distance each time a handle is operated, to provide a cutter also actuated by the handle movement, and to so arrange the mechanism that the cutter does not commence to function until the forward movement of the bottom butter slab has been completed.

A further object of the invention is to provide a butter dispensing machine having a butter container therein adapted to receive a number of slabs of butter one above the other, and to provide wedges for supporting the second lowest butter slab spaced slightly above the bottom one so that the latter may be readily gradually advanced through the container; and to provide means actuated by the return of the butter pusher to its rearmost position for withdrawing the wedges and permitting the butter slab resting thereon to drop to the bottom of the container.

With these and other objects and advantages in view which will hereinafter become apparent, an embodiment of the invention is hereafter described with the aid of the accompanying drawings, in which:

Figure 3 is an enlarged section on the line 3—3 of Figure 2.

Figure 4 is an enlarged section on the line 4—4 of Figure 1.

Figure 5 is an enlarged detail showing the pawl disengaged from the rack by the dog.

Figure 6 is a section on the line 6—6 of Figure 5.

Figure 7 is an enlarged longitudinal section through the centre of the machine and the butter container, showing the position of the mechanism as a piece of butter is being severed from the bottom slab.

Figure 8 is a detail assembly in perspective of the butter pusher.

Figure 9 is a perspective view of a detail.

Figure 10 is a perspective view of the rack, the clevis secured thereto, and the links pivotally mounted on the latter, and Figure 11 is a perspective view showing one set of wedges and the spindle through which they are actuated.

Figure 2:
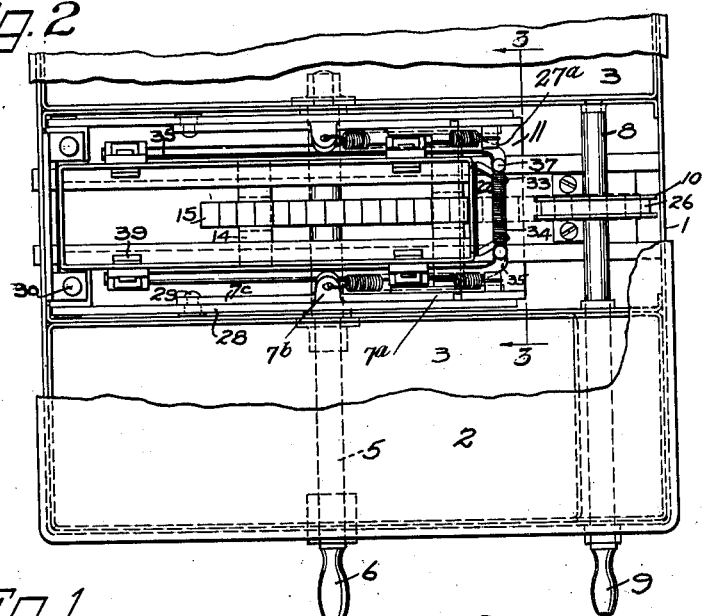
Figure 2 is a plan view of the invention with a portion of the cover broken away.

Referring to the drawings, 1 designates a casing which may be closed by means of a cover 2. Within the casing two spaced and removable refrigerating compartments 3 are housed, and between them a removable butter container 4 is arranged which has opposed openings extending across its full width formed through its ends and extending upwardly from its base. The height of the front opening is slightly greater than that of the slabs of butter which are to be moved therethrough, and the rear opening of the container is high enough to permit a butter pusher 22 to pass therethrough. An opening is also formed through the front of the casing 1 which registers with and is slightly larger than the said front container opening to permit free passage of the bottom butter slab D, which is moved therethrough in a manner hereinafter described.

Extending transversely through the casing 1 beneath the compartments 3 and container 4 is a shaft 5 on one extremity of which a handle 6 is provided exteriorly of the said casing. Fixed on the shaft 5 on both sides of the butter container 4 are elements 7 each of which consists of three arms 7a, 7b and 7c which radiate from the axis of the shaft 5.

A second shaft 8 also extends transversely through the casing 1 behind the butter container and beneath upwardly stepped rear base portions 3a of the compartments 3. On one extremity of the shaft 8 a handle 9 is secured, and within the casing and substantially centrally of its width a pulley 10, in the present instance a double flanged pulley, is secured on the said shaft 8.

Secured transversely of the casing and beneath the container 4 is a channel-shaped member 11 having upturned extremities 11a which are provided with opposed slots 12, and outwardly projecting hinge pins 13. The lower portions of the slots 12 are arcuate while their upper portions are inclined upwardly and rearwardly from the top of the arcuate portions.

Supported beneath the container 4 as by guides 14 so as to be permitted longitudinal movement is a rack 15 having upwardly projecting ratchet teeth. 16 denotes a clevis secured to the under side of the rack 15 intermediately of its length and having its extremities upturned. Studs 17 project outwardly from the latter and upon them levers 18 are pivoted. Through the arms 7a longitudinal slots 19 are formed through which pins 20 pass each of which connects one of the said arms to one extremity of one of the levers 18; while through the opposite extremities of the said levers pins 21 project which also pass through the slots 12.

The butter pusher 22 which is of angle section and has its vertical portion 22a forwardly directed, extends upwardly through a longitudinal slot formed through the base of the container 4 throughout the length of the latter. Extending upwardly from its horizontal portion 22b are vertical flanges 23 adjacent which the said portion 22b is apertured. A pawl 24 is pivoted on the flanges 23 and extends through the aperture in the horizontal portion 22b to engage the ratchet teeth of the rack 15. Pivoted also on the flange 23 is a dog 25 which is so positioned relative to the pawl 24 that when the said dog is turned in one direction it moves the pawl clear of the said ratchet teeth. To the upper extremity of the dog 25 a tape or cord 26 is secured which is also wound around the pulley 10. Thus rotation of the pulley 10 in one direction, imparted through the handle 9, winds the tape 26 onto the said pulley and turns the dog 25 into its pawl-releasing position.

Figure 1:
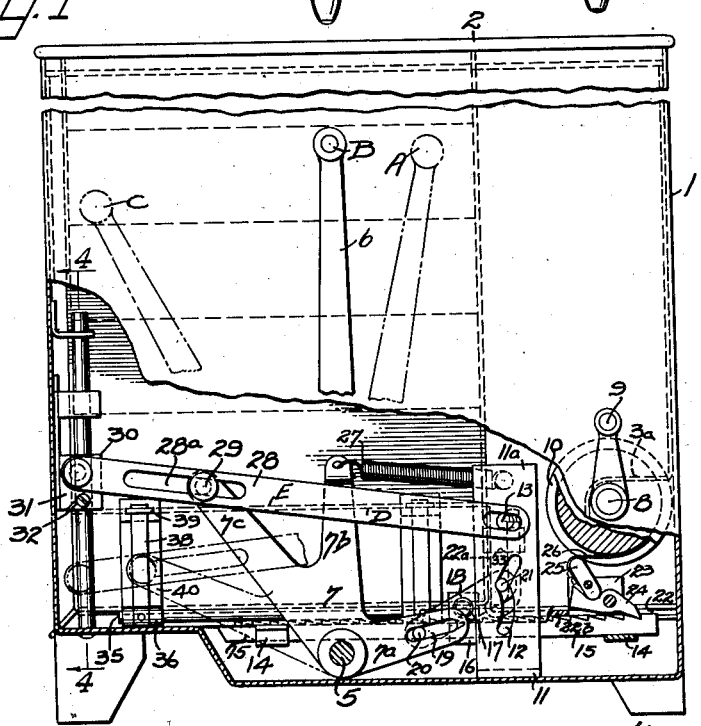
Figure 1 is a side view of the invention partly in section.

Each time the handle 6 is moved from its initial position A to B the pins 21 move from the upper extremities of the slots 12 to their positions shown in Figure 1, thereby advancing the clevis 16 and rack 15; and as the latter is engaged by the pawl 24 the pusher 22 is advanced, carrying the bottom butter slab D forward with it so that its foremost extremity projects through the front opening of the butter container 4. During the movement of the handle 6 from its position B to that indicated at C the pins 21 travel around the arcuate portions of the slots 12, which are radial to the studs 17 so that no further movement is imparted to the rack 15, and into the position shown in Figure 7. Obviously the rack movement is substantially equal to the pitch of the ratchet teeth so that when the handle 6 is returned to its initial position A, which is accomplished by a spring 27 connected both to the arms 7b and to lugs 27a on the upper extremities 11a of the member 11, the rack 15 is moved rearwardly again while the pusher 22 and pawl 24 remain stationary. Thus on each forward movement of the said rack the butter pusher 22 and the bottom butter slab D are advanced a distance substantially equal to the pitch of the ratchet teeth, and the cord or tape 26 is unwound from the pulley 10.

Mounted on the hinge pins 13 are links 28 which are slotted longitudinally at 28a intermediately of their length to receive pins 29 which extend from the outer extremities of the arms 7c. Exteriorly of the container 4 and on opposite sides thereof vertical guides 30 are provided adjacent the front of the casing 1 to support slides 31 which are vertically movable. Extending between the said slides and secured to the latter is a cutter 32 consisting in the present instance of a wire, which extends across the front of the container.

The front extremities of the links 28 are pivotally connected to the slides 31. Due to the provision of the slots 28a downward movement of the slides 31 is delayed until after the handle 6 has been moved forward past its position B and the butter slab D has been advanced by movement of the rack 15; then continued movement of the said handle to its position C moves the slides 31 and cutter 32 downwardly to sever the forwardly projecting portion D1 of the butter slab, which then drops from the machine.

Formed integral with the vertical butter pusher portion 22a are opposed rearwardly and inwardly inclined ears 33 above which a coil spring 34 extends. Mounted in the casing 1, one on each side of the container 4 are two parallel spindles 35 from which arms 37 extend; to the upper extremities of these arms the ends of the spring 34 are secured. Fixed on the spindles 35 are upwardly extending members 38 having inwardly directed elements or wedges 39 freely mounted thereon adjacent their upper extremities which are held in a substantially horizontal position by guides 40 which are preferably made integral with bearings 36 by which the spindles are rotatably held. These wedges 39 normally extend inwardly through slots 4a formed in the vertical walls of the container 4 and support the second lowest slab of butter E and the other slabs which rest thereon, and hold the slab E spaced slightly above the bottom slab D. However when the butter pusher is returned to its rearmost position, as shown in Figure 1, the inclined ears 33 move the upper extremities of the arms 37 outwardly against the tension of the spring 34, turning the spindles 35 and thereby withdrawing the wedges 39 from the butter compartment so that the second lowest slab E may fall to the bottom of the container into the position D to be fed forward by the pusher 22. As soon as the pusher 22 again commences to advance the spring 34 turns the arms 37 so that the wedges 39 return to their inward positions and raise the second lowest slab of butter E clear of the bottom slab D.

From the foregoing it is believed that the construction and operation of the device will be readily understood. The butter container 4 and the refrigerating compartments 3 are readily and separately removable, and the adhesion of the butter holds the pusher 22 against it so that the latter does not move on the rearward stroke of the rack 15. The method of advancing the butter through movement of the handle 6 from its position A to B through movement of the lever 18 and rack 15 has been explained. When the pusher has reached its forward limit of travel the handle 9 is turned by hand to rewind the cord or tape 26 onto the pulley 10, in this manner the pusher 22 is moved back to its initial position as tension of the cord 26 causes the dog 25 to move pivotally and raise the pawl 24 clear of the ratchet teeth on the rack 15. The method by which the forwardly projecting portion of butter is cut vertically by the cutter 32 as the handle 6 is moved from its position B to C has been described; and it will be understood that the slides 31 are raised again on their guides 30 by rearward movement of the handle 6 from C to A which is accomplished by the springs 27.

The purpose of the wedges 39 and the method in which they are withdrawn from the compartment 4 by outward movement of the arms 37 actuated by the ears 33 when the pusher 22 is moved to its rearmost position has also been explained. In this connection it may also be added that when the container 4 is to be inserted or withdrawn the pusher 22 must be moved back to its rearmost position in order to withdraw the wedges 39 from the said container sides.

While in the foregoing the preferred embodiment of the invention has been described and shown, it is understood that the construction is susceptible to such alterations and modifications as fall within the scope of the appended claims.

What I claim is:

1. In a machine of the character described, the combination of a casing having a removable container therein apertured at opposite extremities, a pusher slidable in said casing through one container aperture and towards the other aperture, means for gradually advancing the pusher through the container, a cutter vertically movable in said casing adjacent the other aperture, a transverse shaft mounted on said machine, two elements fixed on said shaft one on each side of the container, two arms on each element, each arm being opposed to one arm on the other element, means cooperating with one opposed pair of arms for actuating the means for gradually advancing the pusher, and means coacting with the other opposed pair of arms for moving the cutter vertically adjacent one end of the container.

2. In an arrangement of the character described, the combination of a casing, a removable container therein having its opposite extremities apertured adjacent its base, a pusher slidable on said casing through one container aperture and towards the other, a rack beneath said container, means for reciprocating said rack, ratchet teeth on said rack, a pawl on said pusher cooperating with the ratchet teeth, a pulley rotatable in said casing, a flexible element wound around said pulley, a dog pivoted on said pusher to which said flexible element is attached, said dog being adapted to move the pawl pivotally, so that when the pulley is rotated and the flexible element is wound thereon, the dog disengages the pawl from the ratchet teeth, and the pusher is moved back through the container.

3. In an arrangement of the character described, the combination of a casing having a container therein, said container having its opposite ends apertured and being adapted to receive a plurality of slabs of material arranged one over the other, a pusher slidable through said container adapted to feed the bottom slab forward, means for actuating the pusher, the container sides having slots formed therethrough, wedges movable through said slots adapted to support the bottom slab but one and hold it spaced above the bottom slab as the latter is fed forward, and means withdrawing the wedges when the pusher is returned to one extremity of its travel so that then the second lowest slab may drop to bottom position in the container.

4. In an arrangement of the character described, the combination of a casing having a container therein, said container having slots formed through its sides and being adapted to receive a plurality of slabs of material arranged one over the other, a pusher slidable through said container adapted to feed the bottom slab forward, means for actuating said pusher, wedges movable through the container slots to support the bottom slab but one and hold it clear of the bottom slab as the latter is fed forward through the container by the pusher, means withdrawing the wedges from the container when the pusher is returned to its rearmost position so that then the bottom slab but one may drop into bottom position, and spring means for returning the wedges inwardly through the slots into such position as to raise the bottom slab but one slightly and hold it spaced above the bottom slab as soon as the pusher is advanced from its rearmost position.

5. In an arrangement of the character described, the combination of a casing, a pusher movable therethrough, means for moving said pusher, opposed wedges adapted to move towards one another and support a second lowest slab of material in said casing, said pusher being adapted to advance the bottom slab therethrough, spindles rotatable in said casing, members fixed on said spindles carrying said wedges, arms projecting from said spindles, a spring connecting the outer ends of the arms holding the opposed wedges towards one another, and ears on said pusher which contact the arms when the pusher is moved to its rearmost position and force said arms outwardly moving the opposed wedges further from one another.

6. In an arrangement of the character described, the combination of a casing, a container therein having slotted sides and apertured ends, a pusher movable through one container aperture towards the other aperture, means for advancing the pusher, means for returning the pusher to its rearmost position, wedges horizontally movable through the container slots to support a slab above the one being advanced by the pusher, inwardly and rearwardly projecting ears on the pusher, and means cooperating with said ears for withdrawing said wedges outwardly through the container slots when the pusher is moved to its rearmost position.

7. In an arrangement of the character described, the combination of a casing, a container therein having slotted sides, a pusher movable through said container, means for advancing the pusher, means for returning the pusher to its rearmost position, wedges horizontally movable through the container slots to support a slab above the one being advanced by the pusher, inwardly and rearwardly projecting ears on said pusher, means coacting with said ears for withdrawing the wedges from the container slots when the pusher is moved to its rearmost position, means holding the wedges substantially horizontal when withdrawn from their container slots, and spring means for moving the wedges inwardly through the slots when the pusher is advanced from its rearmost position.

8. In a machine of the character described, the combination of a casing, a container therein adapted to receive a plurality of slabs of butter placed one upon the other, said container having its front extremity apertured upwardly from its base, said aperture extending across the full width of the container to permit free passage of the bottom butter slab therethrough, a pusher slidable through said container to feed the bottom butter slab through the aperture, means movable through the container sides normally supporting the bottom slab but one horizontal as the bottom slab is moved beneath it by the pusher, and a cutter adapted to cut off the front extremity of said bottom butter slab after it has been fed through said aperture by the pusher.

9. In a machine of the character described, the combination of a casing, a container therein adapted to receive a plurality of slabs of butter placed one upon the other, said container having its opposite extremities apertured upwardly from its base, the front aperture extending across the full width of the container to permit free passage of the bottom butter slab therethrough, a pusher slidable through the container to feed the bottom butter slab through the front aperture, said pusher being adapted to be moved rearwardly through the rear container aperture, to permit removal of said container, means movable through the container sides normally supporting the bottom slab but one so that the bottom slab may be readily moved beneath it, and a cutter adapted to cut off the front extremity of said bottom slab after it has been fed through the aperture.

10. In a machine of the character described, the combination of a casing, a container therein adapted to receive a plurality of slabs of butter placed one upon the other, said container having its opposite extremities apertured upwardly from its base, the front aperture extending across the full width of the container to permit free passage of the bottom butter slab therethrough, a pusher slidable longitudinally through the container to feed the bottom slab through the front aperture, means movable through the container sides normally supporting the bottom slab but one, other means actuated by the pusher when moved to its rearmost position for withdrawing the supporting means for the bottom slab but one outward through the container sides, said pusher being adapted to be moved rearwardly through the rear container aperture to permit a slab of butter to drop onto the container base, means for gradually advancing the pusher through the container, and means for returning the pusher to its rearmost position.

11. In a machine of the character described, the combination of a casing, a container therein adapted to receive a plurality of slabs of butter placed one upon the other, said container having its front extremity apertured upwardly from its base, said aperture extending across the full width of the container to permit free passage of the bottom butter slab therethrough, the container base being longitudinally slotted, a pusher slidable in said container a portion of which depends through said slot, means beneath the container cooperating with the pusher for moving the latter and movable means extending through opposite sides of the container normally supporting the bottom slab but one so that the bottom slab is free to move beneath it.

12. In a machine of the character described, the combination of a casing, a container therein adapted to receive a plurality of slabs of butter placed one upon the other, said container having its front extremity apertured upwardly from its base, to permit free passage of the bottom butter slab therethrough, the container base being longitudinally slotted, a pusher slidable in said container a portion of which depends through said slot, said pusher bearing against the rear face of the bottom butter slab, means beneath the container cooperating with the pusher for moving the latter forward, a cutter adapted to cut off the front extremity of the bottom butter slab after it has been advanced by said pusher through the front apertured extremity of the container, movable means normally extending through opposite sides of the container for supporting the bottom slab but one horizontal, other means operated by movement of the pusher for retracting said movable slab supporting means, and a common operating means for advancing the pusher and actuating the cutter.

13. In a machine of the character described, the combination of a casing, a container therein adapted to receive a plurality of slabs of butter placed one upon the other, said container having its front extremity apertured to permit free passage of the bottom butter slab therethrough, the rear extremity of the container being also apertured, a pusher slidable in said container, the latter having a slot formed longitudinally in its base, a depending portion of said pusher extending through said slot, means beneath the container coacting with the depending portion of the pusher for advancing the latter so that it pushes the bottom butter slab through the front container aperture, movable means normally extending through opposite sides of the container for supporting the bottom slab but one, other means operated by movement of the pusher for retracting said movable slab supporting means, and other means for moving the pusher rearwardly through the rear container aperture to permit the next butter slab to fall onto the container base.

14. In a machine of the character described, the combination of a casing, a container therein adapted to receive a plurality of slabs of butter placed one upon the other, said container having its front extremity apertured to permit free passage of the bottom slab of butter therethrough when moved longitudinally, a pusher slidable through the container to feed the bottom butter slab through said aperture, said container also having slots formed through opposite sides thereof, and means normally extending through said slots engaging the second lowest butter slab and holding it in a substantially horizontal position as the bottom slab is advanced through the container.

15. In a machine of the character described, the combination of a casing, a container therein adapted to receive a plurality of slabs of butter placed one upon the other, said container having its front extremity apertured to permit free passage of the bottom slab of butter therethrough when the latter is moved longitudinally, a pusher slidable through the container to move the bottom slab through said aperture, said container also having slots formed through opposite sides thereof, elements normally extending through said slots to engage the slab of butter above the bottom one and prevent downward movement thereof as the bottom slab is advanced through the container, and spring means normally holding said elements in their slab engaging positions.

16. In a machine of the character described, the combination of a casing, a container therein adapted to receive a plurality of slabs of butter placed one upon the other, said container having its front extremity apertured upwardly from its base to permit free passage of the bottom slab of butter therethrough, a pusher slidable through the container to move the bottom butter slab through said aperture, said container also having slots formed through opposite sides thereof, elements normally extending inwardly through said slots engaging the second lowest butter slab and holding it substantially horizontal as the bottom slab is advanced through the container, and means actuated by the rearward movement of the pusher for withdrawing said elements to permit the next butter slab to fall to the base on the container.

17. In a machine of the character described, the combination of a container of uniform cross section throughout its height, a casing in which said container is mounted, the container having its ends apertured, its base longitudinally slotted, and slots formed through its sides, said container being adapted to receive a plurality of slabs of butter placed one upon the other, a pusher movable in the container to advance the bottom slab through the aperture in one of its ends, a depending portion on the pusher extending through the base slot, means cooperating with said depending portion for moving the pusher, spring actuated means extending through the side slots normally holding the second lowest slab against downward movement, and a cutter movable in front of the container aperture through which the bottom slab is advanced.

18. In a machine of the character described, the combination of a casing, a vertically removable container therein to receive a plurality of slabs of butter placed one upon the other, refrigerating compartments adjacent said container throughout its entire height, said container having one extremity apertured to permit free passage of the bottom butter slab therethrough and having its base longitudinally slotted, a pusher slidable through said container to move the bottom slab of butter, movable means normally extending through opposite sides of the container for supporting the bottom slab but one horizontal, a depending portion on the pusher extending through the base slot, and means cooperating with the depending portion for actuating the pusher.

19. In a machine of the character described, the combination of a casing, a vertically removable container of uniform cross section throughout its height, said container being adapted to receive a plurality of slabs of butter placed one upon the other, the front extremity of the container being apertured to permit free passage of the bottom butter slab therethrough, a pusher slidable through the container to advance the bottom slab through said aperture, movable means normally extending through opposite sides of the container for supporting the bottom slab but one, the rear extremity of the container being apertured to permit passage of the pusher rearwardly therethrough so that the container may be removed from the casing, and refrigerating compartments in said casing adjacent the container throughout its entire height.

CLARENCE I. WOODS.